US006963045B2

(12) United States Patent
Zapletal et al.

(10) Patent No.: US 6,963,045 B2
(45) Date of Patent: Nov. 8, 2005

(54) PLASMA ARC CUTTING TORCH NOZZLE

(75) Inventors: Jiri Zapletal, Pawleys Island, SC (US); Richard Marc Mann, Sr., Claremont, NH (US); Frantisek Krystof, Uherske Hradiste (CZ)

(73) Assignee: Tatras, Inc., Claremont, NH (US)

( * ) Notice: Subject to any disclaimer, the term of this patent is extended or adjusted under 35 U.S.C. 154(b) by 0 days.

(21) Appl. No.: 10/714,109

(22) Filed: Nov. 14, 2003

(65) Prior Publication Data

US 2005/0103752 A1 May 19, 2005

(51) Int. Cl.[7] .............................. B23K 9/00; B23K 9/02

(52) U.S. Cl. ............................... 219/121.48; 219/121.5

(58) Field of Search ....................... 219/121.36, 121.43, 219/121.47, 121.48, 121.49, 121.5, 121.51, 121.52, 121.59, 75, 119

(56) References Cited

U.S. PATENT DOCUMENTS

| | | | | |
|---|---|---|---|---|
| 4,748,312 A | * | 5/1988 | Hatch et al. | 219/121.52 |
| 4,954,688 A | * | 9/1990 | Winterfeldt | 219/121.51 |
| 5,105,061 A | * | 4/1992 | Blankenship | 219/121.52 |
| 5,484,978 A | * | 1/1996 | Hedberg et al. | 219/121.59 |
| 5,587,093 A | * | 12/1996 | Aston | 219/121.52 |
| 5,866,872 A | | 2/1999 | Lu et al. | |
| 5,897,059 A | | 4/1999 | Muller | |
| 6,337,460 B2 | | 1/2002 | Kelkar et al. | |

* cited by examiner

*Primary Examiner*—Tu Hoang
(74) *Attorney, Agent, or Firm*—Warner Norcross & Judd

(57) ABSTRACT

A nozzle for a plasma arc cutting torch is provided with an electrically conductive, heat resistant insert, preferably tungsten or a tungsten alloy. As an alternative to the insert, the material can be coated on the entire inner surface of the nozzle. In either embodiment, the material also can be coated on the outer surface of the nozzle.

13 Claims, 6 Drawing Sheets

PLASMA ARC CUTTING TORCH NOZZLE

BACKGROUND OF THE INVENTION

The present invention relates to plasma arc cutting, and more particularly to plasma arc cutting torches.

The art of plasma arc cutting is well known for cutting materials such as steel at very high temperatures using a tightly spun jet of ionized electrically conductive gas (known as a plasma arc). As shown in FIG. 1, the plasma arc 16 is generated by a torch 10, and is directed at a workpiece 32. The workpiece 32 functions as a conductor through which the plasma arc 16 completes a circuit. The torch body 12 includes the electrical, gas, and cooling connections for transferring the plasma arc 16 to the workpiece 32. A nozzle 14 is attached at the end of the torch 12 over a cathode. The nozzle 14 provides a chamber for ionizing a jet of gas, and focuses the resulting plasma arc 16 through an exit orifice.

The cutting torch nozzle is a consumable fabricated of a relatively inexpensive material such as copper or brass. It is common to replace the nozzle every few hours of cutting time, the length of time between replacements being at least partially dependent on the power of the plasma arc. The primary function of the nozzle is to focus the plasma arc 16 through the relatively small exit orifice. Precise focus is important to provide adequate cutting power. If the nozzle 14 is incapable of focusing the plasma into a tightly spun jet, the resulting plasma arc 16 may not have the power to cut a desired workpiece 32. The inexpensive materials used for fabricating the nozzles have relatively low melting temperatures. Consequently, small changes in the width of the plasma arc, caused, for instance, by erosion of the cathode over time, can change the path of the plasma arc, causing it to melt a portion the nozzle. This in turn leads to further deformed arc patterns.

In the ideal and classic plasma cutting situation, the workpiece is placed directly in line with the nozzle exit orifice. However, it is often the case that a workpiece is presented close to a nozzle without being directly under the nozzle orifice, causing the plasma arc to reach off to one side in search of a completed electrical circuit through the workpiece. This can bring the arc into close proximity or contact with the copper nozzle, melting away some of the copper material and preventing the nozzle from focusing the plasma arc. This failure mode is shown in FIG. 2, wherein a workpiece 32 is positioned so that is it not directly in front of the exit orifice 22, and the normally cylindrical orifice 22 has a portion 22' melted away. Once the nozzle has been damaged, it is no longer capable of focusing the plasma arc properly and must be replaced.

During cutting, molten pieces of the workpiece are sprayed in many directions. The molten pieces, known as slag, are hot enough to melt the outer surface of the nozzle and adhere to the nozzle surface, further deforming the nozzle and significantly shortening the nozzle's useful life.

Prior artisans have attempted to reduce nozzle wear by adding a heat resistant insulating cap, such as a ceramic, to the end of the nozzle. The high temperature qualities of these caps provide some protection from slag, and the insulating qualities act to reduce the tendency of the arc to stray in search of a conductor. Unfortunately, such caps are not completely effective at preventing stray arcs in the presence of a large conductor such as a workpiece, and they provide no protection for the inner surface of the nozzle orifice in these situations.

In a different plasma arc field, plasma spray technology is used to spray a coating onto the surface of another material.

The plasma spray torch provides a lower power plasma arc that uses the surface of the nozzle as an anode. This is known as a non-transferred plasma arc. When the non-transferred arc is starting or ending it engages the inner surface of the nozzle orifice and causes metal loss in the inside of the nozzle orifice. Accordingly, it is known in plasma spray applications to provide a high-temperature insert, such as tungsten, in the nozzle opening to reduce nozzle wear and therefore to increase nozzle life. An example of such an insert is illustrated in U.S. Pat. No. 5,897,059 to Müller.

SUMMARY OF THE INVENTION

The aforementioned problems are overcome by the present invention in which a plasma arc cutting torch nozzle includes an electrically conductive, heat resistant material insert defining the nozzle opening. The insert greatly reduces nozzle wear and therefore greatly increases the life of the nozzle. The insert also permits the plasma arc to begin within the torch before the arc can bridge to the workpiece.

In an alternative embodiment, the heat resistant material is applied to the inner surface of the exit orifice of the nozzle, or to the entire inner surface of the nozzle. The application of a heat resistant material within the nozzle significantly raises the melting temperature of the nozzle so that the nozzle can withstand brief contact with the plasma arc. The addition of this material significantly extends the useful life of the nozzle.

In another preferred embodiment, the heat resistant material is tungsten or a tungsten alloy.

Optionally, the heat resistant material is applied to the outer surface of the nozzle to protect the nozzle from slag and heat. This reduces the likelihood that molten material sprayed from the workpiece will adhere to the outer surface of the plasma arc nozzle.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 3:
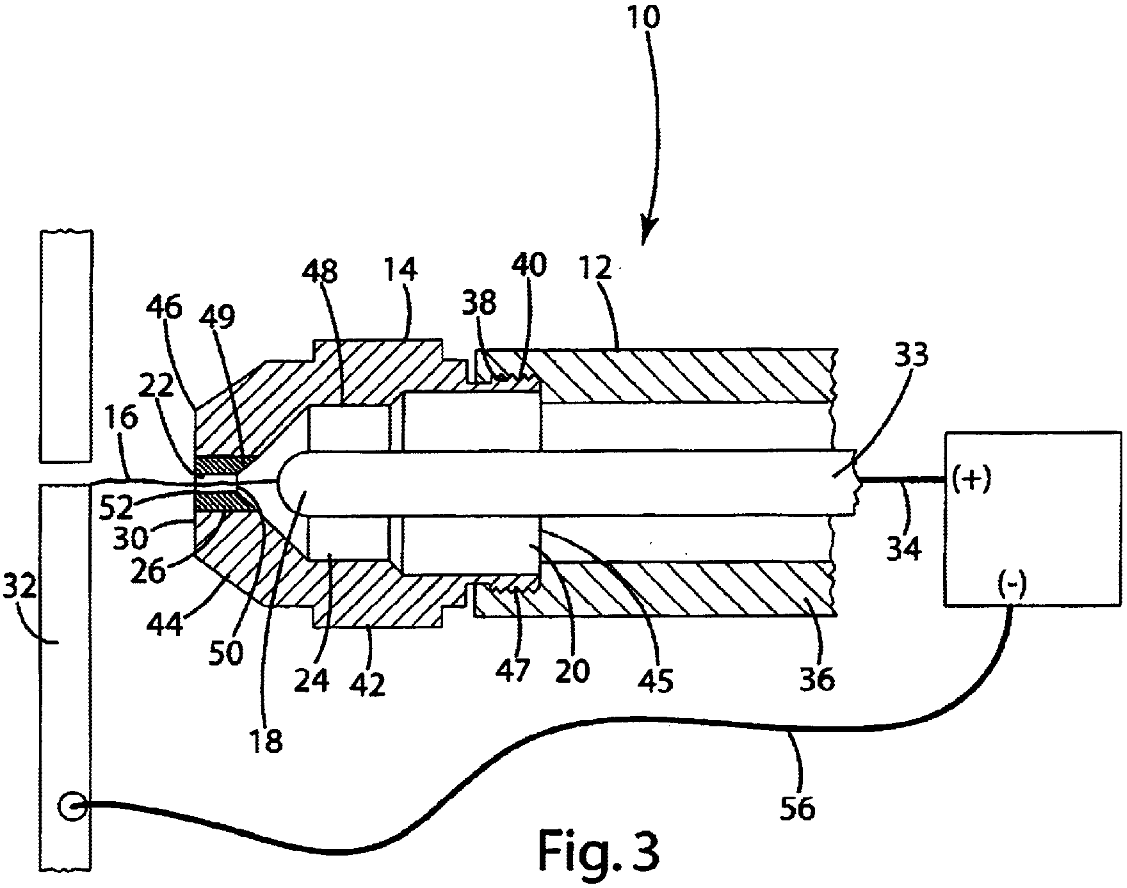
FIG. 3 is a cross sectional view of the plasma arc cutting torch of the present invention.

A torch for plasma arc cutting in accordance with the preferred embodiment of the present invention is shown in FIG. 3 and generally designated 10. The torch 10 generally includes a torch body 12 with a nozzle 14 attached at one end. The torch body 12 provides the necessary gas, electric, and cooling media connections for generating a plasma arc 16, and a conventional cathode emitter 18. The nozzle 14 attaches to the torch body 12 and includes an inlet orifice 20 and a smaller exit orifice 22 at opposite ends. The nozzle 14 generally includes a hollow chamber 24 for housing the cathode 18. When the nozzle 14 is attached to the torch body 12, the cathode 18 is positioned in the center of the hollow chamber 24 facing exit orifice 22. A conductive heat resistant material 26 is applied to the inner surface 49 of the exit orifice 22, and a portion of the exterior face 30 of the nozzle 14.

In operation, a beam of electrons is emitted from the cathode 18 and mixed with a tightly spun conductive gas supplied by the torch body 12, forming a plasma arc. The gas becomes the medium for transferring electrical power from cathode 18 to an anode. Initially, a low power, high voltage arc is transmitted from the cathode 18 and drawn through the exit orifice 22 using the exterior face 30 of the nozzle 14 as the anode for completing an electrical circuit. A workpiece 32, in electrical connection with the torch 10 through work lead 56, is then moved into proximity with the nozzle 14 directly in front of the exit orifice 22 so that the arc jumps from the nozzle 14 directly to the workpiece 32. The power is then turned up so that the plasma arc 16 is capable of cutting through the workpiece 32 with the workpiece 32 functioning as anode and the nozzle 14 no longer in the electrical circuit.

The torch body 12 is generally a cylindrical housing extending along a central axis 33. The torch body 12 preferably includes a number of utility connections such as electric 34, gas, and cooling media (not shown) at a first end 36. The opposite end 38 attaches to the nozzle 14 by conventional means such as threads 40. A conventional cathode 18 is attached to the electrical connection 34 within the torch body 12 (not shown), the cathode 18 extends coaxially along the central axis 33 through the cylindrical torch body 12 and protrudes a substantial distance out of the torch body 12 at end 38. A conventional electrode (not shown), generally comprised of hafnium or another standard material, is located within the cathode 18, extending coaxially there through and in contact with the electrical connection 34. The torch body 12 may also include a conventional swirl ring (not shown) which forces the gas into a swirling motion.

Figure 4:
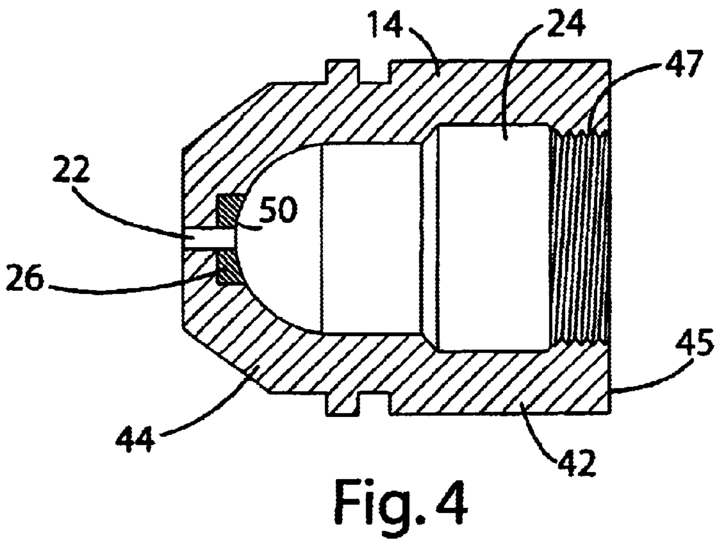
FIGS. 4–9 are cross sectional views of alternative embodiments of the plasma arc cutting torch nozzle.
Figure 5:
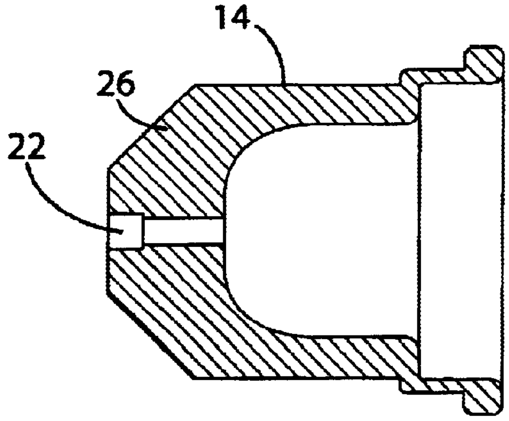
Figure 6:
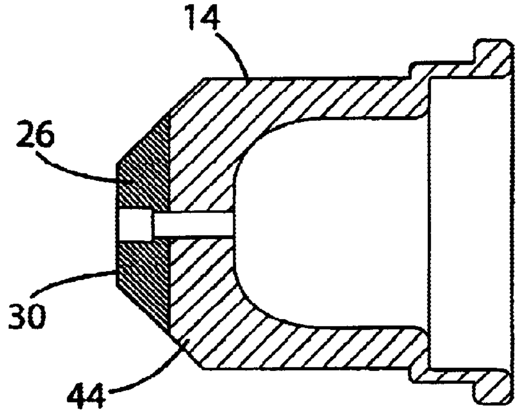
Figure 7:
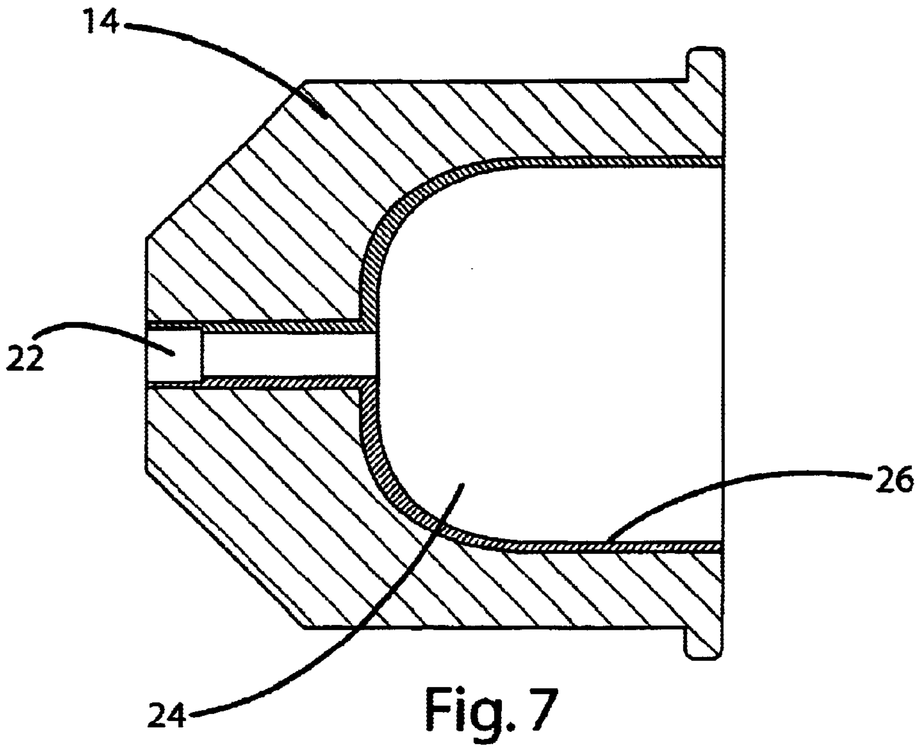

The nozzle body 14 is preferably made of copper, brass, or another standard nozzle material and is generally tubular in shape. In the preferred embodiment, the nozzle 14 is comprised of a generally cylindrical portion 42 and a frustoconical portion 44. The cylindrical portion includes an inlet orifice 20 at the end 45 opposite the frustoconical portion 44. Shown in FIGS. 3 and 4, this end 45 includes threads 47 for attachment to the threads 40 on the torch body 12. Alternatively, the nozzle 14 may include different attachment means for attaching to the torch. FIGS. 5–7 show nozzles that may simply be slid onto the torch body and possibly clamped or otherwise fixed in position. The frustoconical portion 44 of the nozzle 14 tapers towards an opposite end 46 that includes exit orifice 22. Alternatively, the portion 44 may be straight, radiused, or any other appropriate shape. The exit orifice 22 is generally smaller than the inlet orifice 20. The nozzle end 46 opposite the torch body 12 is generally a planar face 30, defining the centrally located exit orifice 22.

The inside of the nozzle 14 preferably defines a hollow chamber 24. The chamber 24 extends the longitudinally through the nozzle 14 about a central axis 33 from the inlet orifice 20 to the exit orifice 22. The exit orifice 22 is preferably a cylindrical bore having an interior surface 49, a first end 50 adjacent to the inner surface 48 of the nozzle 14 and an outer end 52 at the exterior face 30. The size of exit orifice 22 may vary depending on the size and power of the plasma arc 16 that is required.

In a preferred embodiment, the nozzle 14 is provided with a heat resistant material 26. The heat resistant material 26 is preferably tungsten, whether pure, alloyed, or including any of the various rare earth oxides such as thorium, cerium, zirconium, and lanthanum. Alternatively, many other conductive heat resistant materials may be used, such as zirconium, hafnium, niobium, tantalum, molybdenum, rhenium, osmium, and iridium. Additionally, high temperature resistant materials that are not conductive may be used by adding a conductive strip to the material so that the material can carry a current. The heat resistant material 26 may be applied to the copper nozzle 14 by any conventional method, such as brazing, plasma spray, thermal spray, welding, mechanical fit, distortion, crimping, swaging, or pressing the material into the nozzle body. Additionally a separate insert of the heat resistant material 26 may be added by pinning, threading, clamping, or other conventional means.

Figure 8:
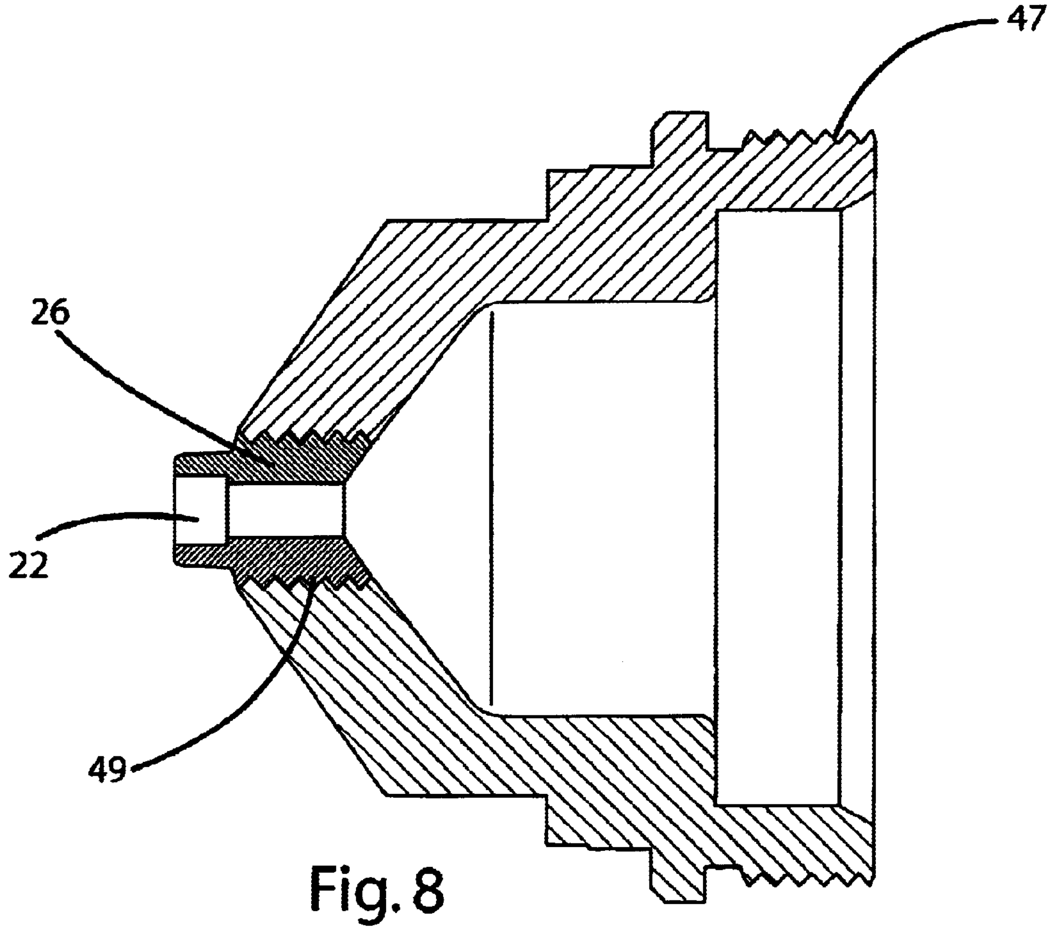
Figure 9:
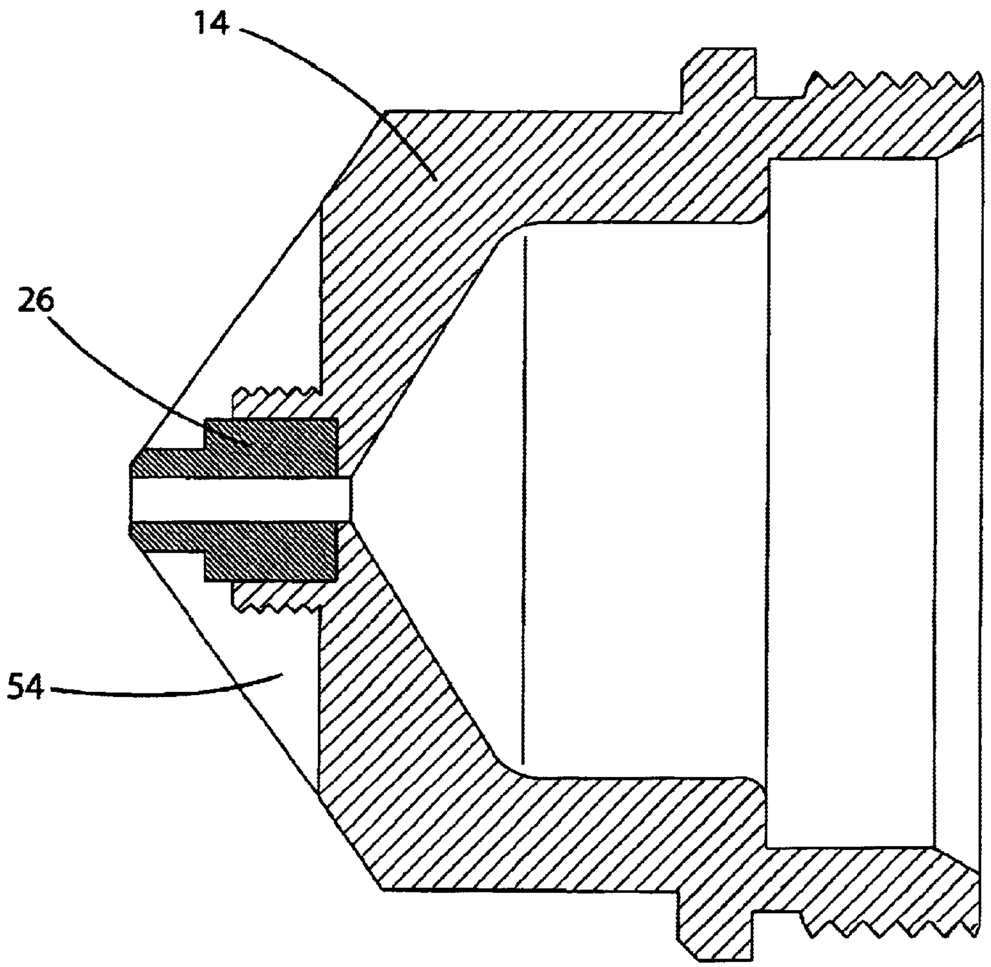

Shown in FIG. 3, the heat resistant material 26 is preferably added to the interior surface 49 of the exit orifice 22, extending the length of the exit orifice 22. In a most preferred embodiment, the heat resistant material 26 is additionally applied to the exterior face 30 of the nozzle 14, a combination of that shown in FIGS. 3 and 6. Alternatively, there are many other locations and combinations thereof that may receive the heat resistant material 26. FIG. 4 shows the material 26 extending through only a portion of the exit orifice 14, starting at the inner end 50. FIG. 5 shows a nozzle 14 entirely comprised of the heat resistant material 26. FIG. 6 shows the material 26 applied only to the exterior face 30 and a portion of the frustoconical section 44 of the nozzle 14. FIG. 7 shows a thin layer of heat resistant material 26, such as that applied by a thermal spray, on the entire inner surface of the chamber 24 and exit orifice 22. As shown in FIGS. 8 and 9, the heat resistant material 26 may be applied as a separate insert. FIG. 8 shows the material 26 threaded into the inner surface 49 of the exit orifice 22. FIG. 9 shows a three-piece nozzle, wherein the heat resistant material 26 is an insert that is held in place by a cap 54 that threads onto the nozzle 14.

Figure 1:
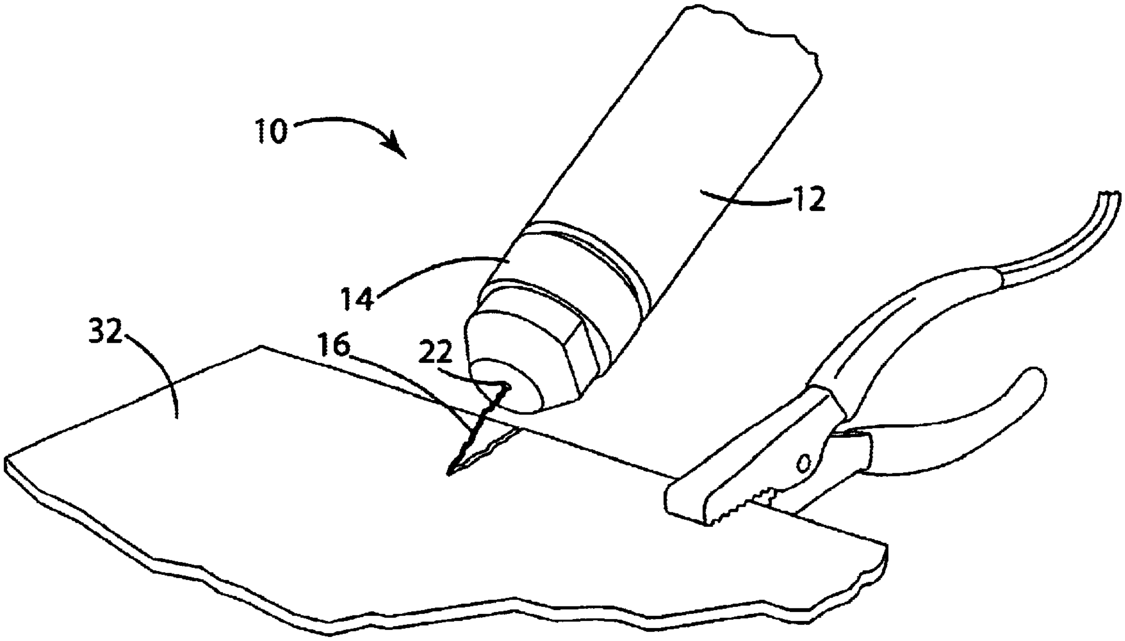
Fig. 1 (Prior Art)
FIG. 1 is a perspective view of a plasma arc cutting torch in operation.
Figure 2:
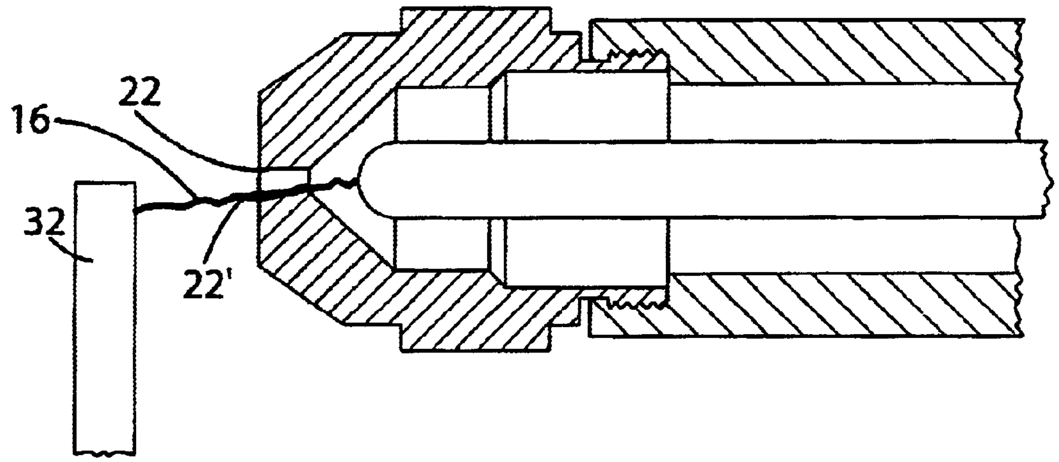
Fig. 2 (Prior Art)
FIG. 2 is a cross sectional view of a prior art plasma arc cutting torch in failure mode.

Referring now to FIGS. 1 and 3, the workpiece 32 to be cut is a conductive material placed external to the exit orifice 22, with the specific location to be cut in close proximity to the orifice 22. The workpiece 32 is generally presented perpendicular to the nozzle 14, but, as shown in FIG. 1, the workpiece 32 may be presented at an angle for beveling. As the workpiece 32 is being cut, it is in electrical connection with the plasma torch 10, preferably connected to the torch 10 with a conventional electrical work lead 56.

In operation, the nozzle 14 is attached to the torch body 12 by threads 40 and 47. The cathode 18 including a terminal electrode extends into the nozzle 14 through chamber 24 along axis 33. As power is sent through the torch 12 and electrode 41 along the central axis 33, a swirling gas is emitted from the torch 12 through inlet orifice 20 and chamber 24. The gas is ionized (forming a plasma arc 16) and sent through the exit orifice 22. Initially, only a low current, high voltage pilot arc is emitted. The pilot arc is blown through the orifice 22 and completes a circuit through the exterior face 30 of the conductive nozzle 14. The torch 12 is then moved into close proximity with workpiece 32 until the arc jumps from the nozzle 14 anode to the workpiece 32, forming a transferred plasma arc 16. Power to the cathode/electrode 18 is then increased so that the plasma arc 16 cuts the workpiece 32. The heat resistant material 26 interacts with the arc 16 traveling through the exit orifice 22 and the slag spraying onto the outer surface 30 of the nozzle 14, prolonging the life of the nozzle 14.

Alternative Embodiment

In a first alternative embodiment, the nozzle 14 may be used for welding a workpiece 32 instead of cutting. This embodiment is similar in all aspects to the disclosed embodiment for cutting a workpiece 32, including the transfer of a plasma arc from the cathode 18 to the workpiece 32 as the anode for completion of an electrical circuit, except for the amount of power required of the plasma arc 16. In order to weld the workpiece 32, a lower amount of power is needed, so that the plasma arc 16 is capable of melting the workpiece 32, but not cutting the workpiece 32. The application and placement of the heat resistant material 26 is similar to that of the aforementioned preferred embodiment. The power output is controlled by the conventional plasma torch 10 and power supply.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

What is claimed is:

1. A plasma arc cutting torch for directing a plasma arc from said torch to a workpiece, said torch comprising:

a cutting torch body defining an axial bore;

a cathode supported within said axial bore, the plasma arc transferred from said cathode to the workpiece through said axial bore along a central axis;

a lead attachable to a workpiece in electrical communication with said cathode; and a nozzle removably supported on said cutting torch body and including an orifice in fluid communication with said axial bore, said nozzle including a body fabricated of a first material, said nozzle further including a second material defining said orifice, said nozzle focusing said plasma arc through said axial bore and said orifice along said central axis, said second material being a high heat resistant, electrically conductive metal electrically insulated from said cathode, the melting temperature of said second material being higher than the melting temperature of said first material.

2. The plasma arc cutting torch of claim 1 wherein said second material includes tungsten or a tungsten alloy.

3. The plasma arc cutting torch of claim 2 wherein:

said nozzle includes an inner surface; and said second material forms at least a portion of said inner surface.

4. The plasma arc cutting torch of claim 1 wherein said second material is an insert secured within said nozzle body.

5. The apparatus of claim 3 wherein:

said second end includes an inner surface; and said heat resistant, electrically conductive material is coated on said inner surface.

6. A plasma arc cutting torch for creating a transferred plasma arc comprising:

a plasma arc cutting torch;

a nozzle body attachable to said torch, said nozzle body defining an axial bore extending about a central axis to an exit opening, at least a portion of said nozzle body including a layer of tungsten, said portion including said exit opening; and a cathode coaxially disposed within said opening, said cathode transferring a plasma arc along said central axis through said opening to a workpiece, such that said cathode is in electrical connection with said workpiece, said layer of tungsten electrically insulated from said transferred plasma arc, said nozzle body including said layer of tungsten focusing said plasma arc along said central axis and through said exit opening.

7. The cutting torch of claim 6 wherein said plasma arc is transferred to said workpiece for cutting said workpiece.

8. The cutting torch of claim 6 wherein said plasma arc is transferred to said workpiece for welding said workpiece.

9. The cutting torch of claim 7 or claim 8 wherein said exit opening includes an inner surface, said inner surface including said layer of tungsten.

10. The cutting torch of claim 9, wherein said layer of tungsten extends throughout axial bore.

11. The cutting torch of claim 10 wherein all of said nozzle body is comprised of said layer of tungsten.

12. The cutting torch of claim 11 wherein said layer of tungsten is a thermal spray coating.

13. The cutting torch of claim 12 wherein said tungsten is attached as a separate piece.

* * * * *